(12) United States Patent
Flanagan (10) Patent No.: US 10,629,419 B2
(45) Date of Patent: Apr. 21, 2020

(54) METHOD OF DETERMINING PRESENCE OF ISOTOPES

(71) Applicant: THE UNIVERSITY OF MANCHESTER, Manchester (GB)

(72) Inventor: Kieran Flanagan, Glossop (GB)

(73) Assignee: THE UNIVERSITY OF MANCHESTER, Manchester (GB)

(*) Notice: Subject to any disclaimer, the term of this patent is extended or adjusted under 35 U.S.C. 154(b) by 0 days.

(21) Appl. No.: 16/343,192

(22) PCT Filed: Oct. 16, 2017

(86) PCT No.: PCT/GB2017/053127
§ 371 (c)(1),
(2) Date: Apr. 18, 2019

(87) PCT Pub. No.: WO2018/073570
PCT Pub. Date: Apr. 26, 2018

(65) Prior Publication Data
US 2019/0244797 A1    Aug. 8, 2019

(30) Foreign Application Priority Data
Oct. 18, 2016   (GB) .................................. 1617628.1

(51) Int. Cl.
*G01N 27/64*    (2006.01)
*H01J 49/40*    (2006.01)
(Continued)

(52) U.S. Cl.
CPC .......... *H01J 49/0027* (2013.01); *G01N 27/64* (2013.01); *H01J 49/162* (2013.01); *H01J 49/40* (2013.01); *H01J 49/00* (2013.01)

(58) Field of Classification Search
CPC .......... H01J 49/40; H01J 49/142; H01J 49/00; H01J 49/0413; H01J 49/161; H01J 49/162;
(Continued)

(56) References Cited

U.S. PATENT DOCUMENTS 4,442,354 A * 4/1984 Hurst ..................... G01N 21/63
                                                    204/192.1
4,658,135 A * 4/1987 Allman ................. H01J 49/164
                                                    250/282
(Continued)

FOREIGN PATENT DOCUMENTS

WO    2011/098834 A1    8/2011

OTHER PUBLICATIONS

British Search Report, dated Apr. 5, 2017, for British Application No. GB1617624.0. (3 pages).
(Continued)

*Primary Examiner* — David A Vanore
(74) *Attorney, Agent, or Firm* — Seed IP Law Group LLP (57) ABSTRACT

A method of determining the presence of isotopes in a sample, comprising (i) providing a sample beam containing the sample; (ii) causing the sample beam to travel back and forth along a single longitudinal axis; (iii) ionising the sample beam with one or more lasers, wherein ionising the sample beam comprises operating the one or more lasers at a plurality of frequencies; (iv) determining time of flight data of a first part of the sample beam relative to a second part of the sample beam; (v) determining an ionisation time using the time of flight data; (vi) obtaining data relating to the frequency of the one or more lasers at the ionisation time; and (vii) determining the presence of isotopes in the sample using the data relating to the frequency of the one or more lasers at the ionisation time.

22 Claims, 5 Drawing Sheets

(51) Int. Cl.
*H01J 49/00* (2006.01)
*H01J 49/16* (2006.01)

(58) Field of Classification Search
CPC ....... H01J 49/401; B01D 59/44; G01N 21/63; G01N 23/225; G01N 27/64
USPC ........ 250/288, 282, 423 P, 281, 283; 850/18
See application file for complete search history.

(56) References Cited

U.S. PATENT DOCUMENTS

| | | | | |
|---|---|---|---|---|
| 4,734,579 | A * | 3/1988 | Lucatorto | B01D 59/44 250/282 |
| 7,501,620 | B2 | 3/2009 | Ogawa et al. | |
| 9,312,111 | B2 * | 4/2016 | Bendall | H01J 49/0004 |
| 2005/0230612 | A1 | 10/2005 | Weber | |
| 2019/0244797 | A1 * | 8/2019 | Flanagan | G01N 27/64 |
| 2019/0259596 | A1 * | 8/2019 | Flanagan | H01J 49/161 |

OTHER PUBLICATIONS

British Search Report, dated Apr. 5, 2017, for British Application No. GB1617628.1. (3 pages).

Fassett et al., "Time-Resolved Magnetic Dispersion for Large Isotope Ratio Measurements in Resonance Ionization Mass Spectrometry," *International Journal of Mass Spectrometry and Ion Processes* 69:285-296, 1986.

Flanagan et al., "Collinear Resonance Ionization Spectroscopy of Neutron-Deficient Francium Isotopes," *Physical Review Letters* 111(21):212501, 2013. (4 pages).

Hall et al., "A penetrating field electron-ion coincidence spectrometer for use in photoionization studies," *Measurement Science and Technology* 3:316-324, 1992.

International Search Report, dated Dec. 15, 2017, for International Application No. PCT/GB2017/053127. (15 pages).

International Search Report, dated Jan. 3, 2018, for International Application No. PCT/GB2017/053126. (16 pages).

Kluge, "Resonance Ionization Spectroscopy and its Application", *Acta Physica Polonica A* 86(1-2):159-171, 1993.

Larimian et al., "Coincidence spectroscopy of high-lying Rydberg states produced in strong laser fields," *Physics Review A* 94: 2016. (5 pages).

Schulz et al, "Resonance Ionization Spectroscopy on a Fast Atomic Ytterbium Beam", *Journal of Physics B: Atomic, Molecular and Optical Physics* 24(22): 1991. (25 pages).

* cited by examiner

METHOD OF DETERMINING PRESENCE OF ISOTOPES

This invention relates to a method of determining the presence of isotopes in a sample, and, in particular, wherein the sample forms part of a sample beam.

BACKGROUND

Apparatuses and methodologies for measuring trace isotopes in large samples are known. Most current techniques are typically limited to detecting isotopes at 1 part in $10^{13}$ or $10^{14}$. For example, Inductively Coupled Plasma Mass Spectrometry (ICP-MS) can reach a level of 1 part in $10^{14}$ but only where there are no interference species present, which is rarely the case. For ICP-MS the current limit is ranges from 1 ppb to 0.001 ppb (or $10^{-12}$) but in special cases this can be extended to below ppt ($10^{-12}$).

Other prior art techniques for measuring trace isotopes permit detection at 1 part in $10^{15}$ or even 1 part in $10^{18}$ or $10^{19}$ with additional processing. Such techniques include the use of large accelerator mass spectrometers, such as the VERA facility in Wien which has a 3 MV Pelletron accelerator. However, such apparatuses are extremely costly (e.g. around £10 million), and the methodologies require a large team of personnel and take an undesirably long time period.

It is an object of certain embodiments of the present invention to overcome or mitigate certain disadvantages associated with prior art arrangements and methods.

BRIEF SUMMARY OF THE DISCLOSURE

In accordance with an aspect of the present invention there is provided a method of determining the presence of isotopes in a sample, comprising:
  providing a sample beam containing the sample,
  causing the sample beam to travel back and forth along a single longitudinal axis;
  ionising the sample beam with one or more lasers, wherein ionising the sample beam comprises operating the one or more lasers at a plurality of frequencies;
  determining time of flight data of a first part of the sample beam relative to a second part of the sample beam;
  determining an ionisation time using the time of flight data;
  obtaining data relating to the frequency of the one or more lasers at the ionisation time; and
  determining the presence of isotopes in the sample using the data relating to the frequency of the one or more lasers at the ionisation time.

In certain embodiments, the step of causing the sample beam to travel back and forth along the single longitudinal axis may comprise directing the sample beam into an ion trap.

The method may further comprise directing the sample beam out of the ion trap prior to determining the time of flight data of the first part of the sample beam relative to the second part of the sample beam. The step of determining the time of flight data of a first part of the sample beam relative to a second part of the sample beam may include detecting the first part of the sample beam and the second part of the sample beam with one or more detectors.

In certain embodiments, the ion trap may be provided by a pair of electric potentials. In particular embodiments, the ion trap may comprise a Paul ion trap or a Penning ion trap.

The step of providing the sample beam containing the sample may comprise providing an ion beam. For example, a plasma ion source, a sputter ion source, or a laser ion source may be provided for providing the ion beam. Alternatively, a sample beam may be provided that is subsequently ionized prior to further ionization of the sample beam with the one or more lasers (operating at the plurality of frequencies). In certain embodiments, the sample beam contains 1+ ions prior to the step of ionising the sample beam with the one or more lasers (either through an initial step of ionization, or the sample beam being provided in an ionized state).

In certain embodiments, the step of ionising the sample beam with the one or more lasers comprises producing 2+ ions. A plurality of different charges in the sample beam will cause regions of the beam to travel at different velocities along the longitudinal axis.

In certain embodiments, the plurality of frequencies at which the one or more lasers is operated may include at least one electronic transition resonance of the sample. In certain preferable embodiments, operating the one or more lasers at the plurality of frequencies may comprise operating the one or more lasers at the plurality of frequencies multiple times. In certain embodiments, operating the one or more lasers at the plurality of frequencies may comprise scanning the one or more lasers through a range of frequencies.

In certain embodiments, prior to the step of causing the sample beam to travel back and forth along the single longitudinal axis, the sample beam may be mass separated to produce a mass separated beam. In certain embodiments, the mass separated beam may then be spatially bunched prior to the step of causing the sample beam to travel back and forth along the single longitudinal axis.

The step of determining the presence of isotopes may comprise identifying a single isotope contained in the sample using the data relating to the frequency of the one or more lasers at the ionisation time. The method may be repeated to identify one or more other isotopes of the sample.

The step of ionising the sample beam with the one or more lasers may comprise resonantly ionising the sample beam with one or more lasers arranged collinearly with the sample beam, and the method further comprises obtaining data relating to resonantly produced electrons resulting from the ionisation of the sample beam, wherein the step of determining the presence of isotopes in the sample further comprises using the data relating to resonant electrons.

Determining the presence of ions in the sample may comprise:
  producing an ion signal relating to ions resulting from the resonant ionisation of the sample beam; and
  processing the ion signal using the data relating to the resonantly produced electrons.

The method may further comprise determining a resonance time period using the data relating to the resonantly produced electrons, wherein processing the ion signal comprises excluding parts of the ion signal that are not associated with the determined resonance time period.

The method may further comprise determining a detection period using the data relating to the resonantly produced electrons, and wherein determining the presence of ions in the sample comprises detecting ions resulting from the resonant ionisation of the sample beam during the determined detection period.

In certain embodiments, the detection period may begin when a resonantly produced electron is detected. Alternatively, the detection period may begin after a delay period following the detection of a resonantly produced electron. The delay period may be a function of data relating to the time of flight of resonantly produced electrons and data relating to the time of flight of the sample beam. The delay period may be defined as $\overline{TOF}_{sample} - \overline{TOF}_{electron}$, where $\overline{TOF}_{sample}$ is the mean time of flight of sample beam and $\overline{TOF}_{electron}$ is the mean time of flight of the resonantly produced electrons.

Obtaining data relating to the resonantly produced electrons may comprise detecting resonantly produced electrons.

The method may comprise extracting resonantly produced electrons using a penetrating field extractor prior to the step of detecting resonantly produced electrons.

Detecting resonantly produced electrons may include rejecting collisional electrons.

Rejecting collisional electrons may comprise deflecting collisional electrons away from resonantly produced electrons.

The method may comprise using a cylindrical deflector analyser to deflect collisional electrons away from resonantly produced electrons.

The step of determining the presence of ions in the sample using the data relating to resonant electrons may comprise identifying isotopes present in the sample.

In certain embodiments, the laser may be one or more pulsed and/or continuous wave lasers. Such suitable lasers include narrowband and broadband lasers. Suitable pulsed lasers may operate in the nanosecond range, and/or may include, without limitation, dye lasers TiSA lasers (which may be injection seeded), and Nd:YAG. Suitable Nd:YAG lasers may be pumped by flashlamps, fiber lasers or DPSS lasers. Suitable dye lasers and TiSa lasers may have a bandwidth greater than 1 GHz. Suitable injection seeded TiSA lasers may have a bandwidth between 6 and 100 MHz. Suitable continuous wave laser include, without limitation, ring dye lasers, TiSA lasers, diode lasers and fiber lasers and/or may have a bandwidth less than 5 MHz.

BRIEF DESCRIPTION OF THE DRAWINGS

Embodiments of the invention are further described hereinafter with reference to the accompanying drawings, in which.

DETAILED DESCRIPTION

Figure 1:
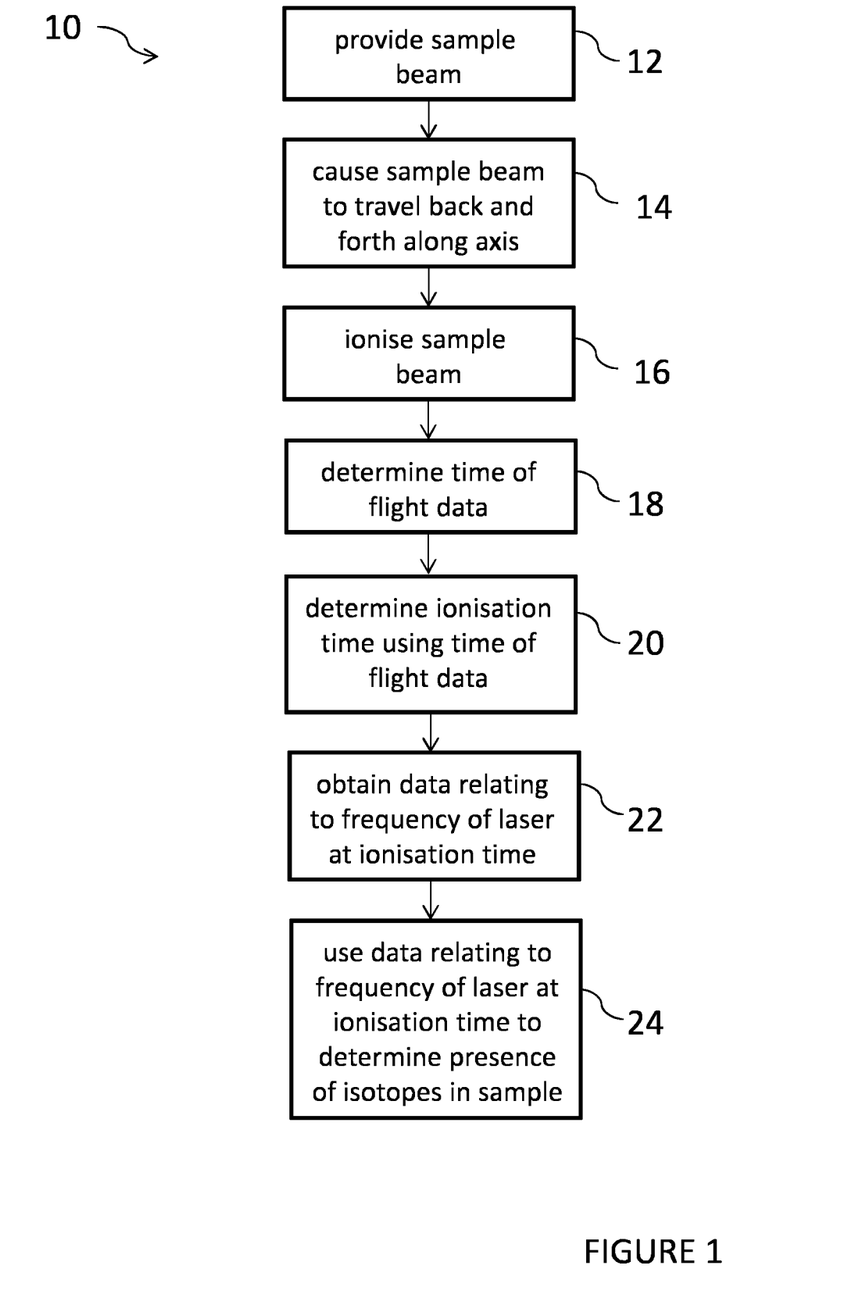
FIG. 1 shows a method according to an embodiment of the present invention.
Figure 2:
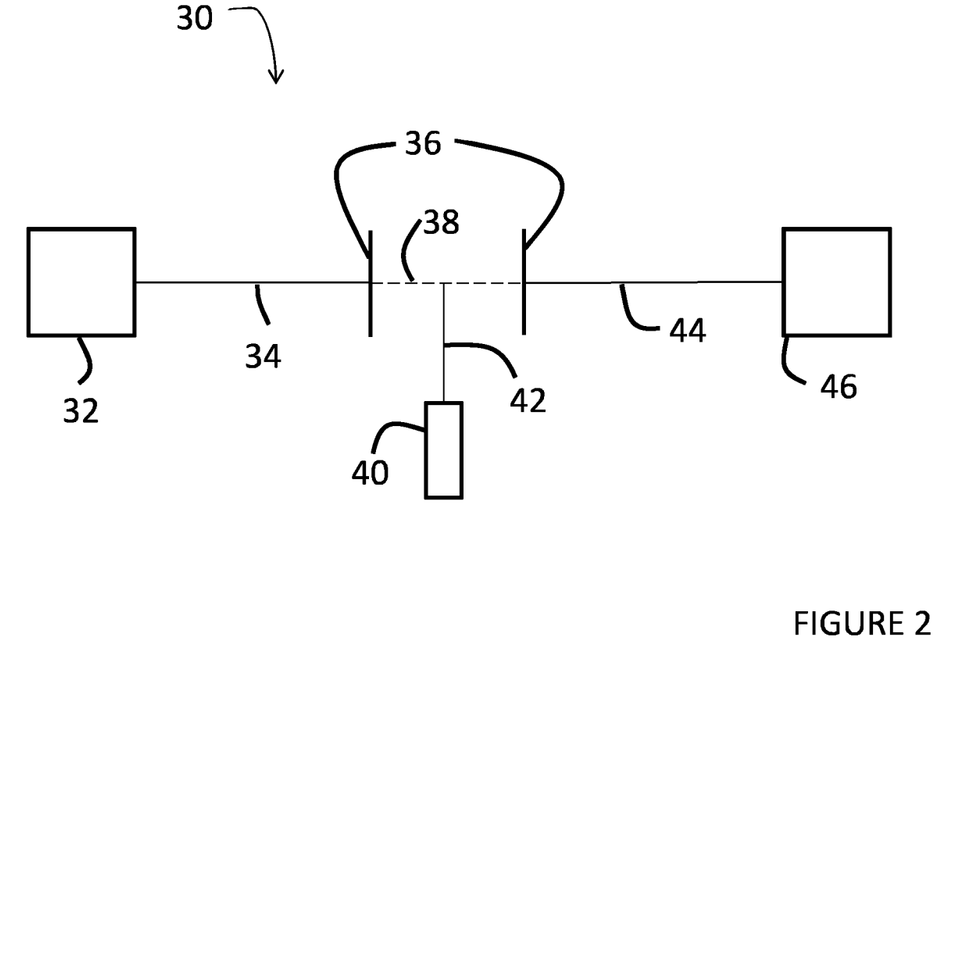
FIG. 2 shows a schematic drawing of an apparatus for performing the method shown in FIG. 1, according to an embodiment of the present invention.

FIG. 1 illustrates a method 10 of determining the presence of isotopes in a sample, in accordance with an embodiment of the present invention. FIG. 2 schematically shows an apparatus 30 for performing the method in accordance with a non-limiting embodiment of the present invention.

The method 10 comprises providing 12 a sample beam containing the sample and causing 14 the sample beam to travel back and forth along a single longitudinal axis. In certain embodiments, this step 14 may comprise initially ionizing the sample beam and passing the sample beam into a multi-reflection trapping region. Alternatively, step 12 may comprise providing an already ionized sample beam that may then be passed into a multi-reflection trapping region. Multi-reflection trapping regions (ion traps) use electric and/or magnetic fields to capture charged particles. Examples include, but are not limited to, a Paul ion trap and a Penning ion trap.

FIG. 2 shows a sample source 32 (e.g. an ion source) providing the sample beam 34, and a multi-reflection trapping region 36 ("ion trap") comprising a pair of electric potentials that causes the (ionized) sample beam 34 to travel back and forth along longitudinal axis 38 in accordance with step 14 of the method 10. In certain non-limiting embodiments, the sample source 32 may comprise a plasma ion source, a sputter ion source, or a laser ion source. The sample source 32 may be operated at a high voltage e.g. between 1 kV and 50 kV, however accelerating voltages outside of this range may be used to accelerate the sample beam 34.

Prior to entering the ion trap 36, the sample beam 34 may be mass separated, i.e. separated according to the mass of its constituent parts. In certain embodiments, this may be achieved by the use of a dipole magnet, a velocity filter, or a quadrupole mass filter. Additionally, the mass separated beam may be bunched. For example, the mass separated beam may be injected into a gas-filled linear Paul trap, where the energy spread and emmitance of the beam is reduced and it is trapped. This is an initial trap prior to entry into the ion trap 36. This initial trapping may cause the continuous beam to become a bunched beam, where regions of the beam are spatially separated from other regions of the beam.

In the ion trap 36, changing the beam energy traps the beam. For example, using a pulsed drift tube or reducing the potential barrier at one end of the ion trap 36 may change the beam energy.

In the ion trap 36, the sample beam is (further) ionized at step 16 by operating one or more lasers 40 at a plurality of frequencies whilst the sample beam travels back and forth along the longitudinal axis. FIG. 2 shows a laser beam 42 produced by the one or more lasers 40, where the axis of the laser beam 42 is orientated perpendicularly to the longitudinal axis 38 along which the sample beam 34 is travelling back and forth. In alternative embodiments, the laser beam 42 may be arranged differently relative to the longitudinal axis 38. In certain preferable embodiments, the laser beam 42 may be collinear with the longitudinal axis 38 and such embodiments may provide a higher resolution.

In certain embodiments, the ionization by the one or more lasers 40 comprises stepwise excitation of the sample beam 34. In embodiments in which the laser beam 42 is arranged collinearly with the longitudinal axis 38, the one or more lasers 40 may be pulsed and timed so that the sample beam 34 is excited when travelling in the either the collinear or anticollinear direction along the longitudinal axis 38.

The one or more lasers 40 is operated at a plurality of frequencies. In certain embodiments, the one or more lasers 40 is scanned across known resonant frequencies (i.e. electronic transition resonances) associated with the sample beam 34. In certain embodiments, this scan is performed multiple times.

The (further) ionization 16 caused by the one or more lasers 40 creates ions that each has a different charge relative to a remainder of the sample beam. Consequently, the sample beam will contain ions that have different velocities relative to one another, where the velocity of a particular ion will be determined by its charge. As a result of the differential velocities within the sample beam, bunches of different ions travelling at different velocities will manifest as the beam travels back and forth along the longitudinal axis. In one embodiment, the sample beam 34 entering the ion trap 36 will be 1+ ions, and the step 16 of ionizing the sample beam 34 with the one or more lasers 40 produces 2+ ions. In such embodiments, the 2+ ions will travel with a different velocity relative to the remaining 1+ ions of the same mass. Consequently, the 2+ ions will spatially separate along the sample beam from the 1+ ions. That is, the step of ionization 16 will create bunched regions of different ions, i.e. a bunched ion beam.

After a fixed trapping time in the ion trap 36 (which may be determined by the pressure and desired number of scans across the ionic resonance), the bunched ion beam (indicated by numeral 44 in FIG. 2) may be extracted from the ion trap 36 and travel towards a detector 46. In certain embodiments, the extraction may be caused by either raising the potential of the pulsed drift tube (if being utilized) or lowering the potential barrier at the opposite end of the ion trap 36 from where the sample beam 34 entered the ion trap 36.

In certain non-limiting embodiments, the detector 46 may be one or more detectors, and in certain embodiments each may comprise a channeltron or an electron multiplier. The detection of an ion represents a stop time that may be used to determine the time of flight of the ions since being confined within the ion trap 26.

Indeed, the method 10 further comprises the step 18 of determining time of flight data of a first part of the ionised sample beam 44 relative to a second part of the ionized sample beam 44, where the first and second parts have different charges. By measuring or otherwise determining the difference in time of flight between the first part and second part of the ionized sample beam 44 (e.g. the difference between the 2+ and the 1+ ions, which may be measured at different detectors), it is possible to determine the time when one of the first or second parts (e.g. the 2+ ions) was resonantly created. In accordance with the present invention, the method 10 comprises a step 20 of determining the ionization time using the time of flight data determined in step 18. Since the timing and frequency profile (with respect to time) of the one or more lasers 40 is known, the frequency at which the one or more lasers 40 was operating at the ionization time can be determined, and this frequency data can be used (at step 24 of the method 10) to determine the presence of particular isotopes present in the sample. That is, once the frequency of the one or more lasers 40 that caused resonant ionization is known, this can be used to identify particular isotopes for which ionic resonances (or electronic transition resonances) are known. Data relating to electronic transition resonances of particular may be obtained from a look-up table or other database source.

Certain embodiments of the present invention are advantageous over prior art arrangements in that they avoid the loss in efficiency associated with the one or more lasers not being on resonance with the sample during the scanning process. Furthermore, certain embodiments additionally allow the simultaneous recording of isobaric masses for beam monitoring by fast deflection of the bunches (of the bunched beam after it has left the ion trap) to one or more detectors.

In accordance with embodiments of the present invention, the sample to be investigated may comprise atoms or molecules that may be subsequently ionized, or ions or ionized molecules may be provided in the first instance. Ionisation is required for trapping the sample in an ion trap.

Figure 3:
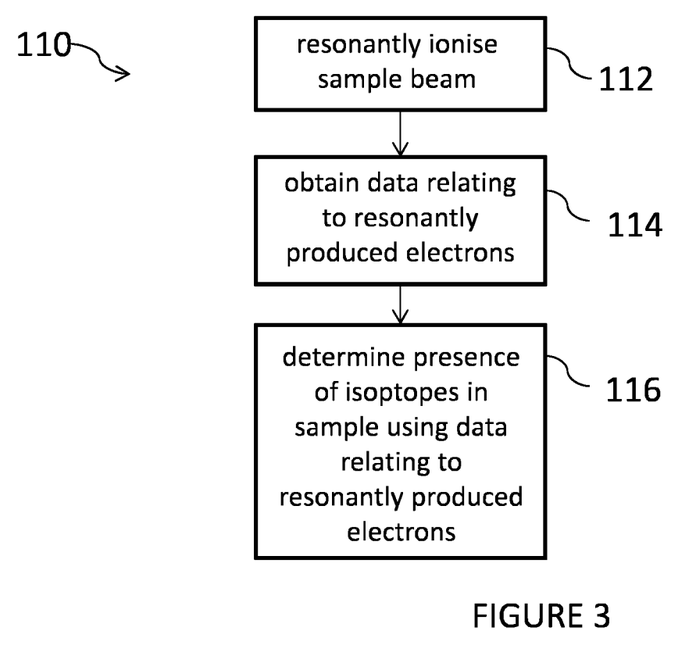
FIG. 3 shows steps of a method according to an alternative embodiment of the present invention.

In certain embodiments, the above described method may be combined with the steps of method 110 shown in FIG. 3.

In particular, the step 16 of ionizing the sample beam with the one or more lasers may comprise resonantly ionizing the sample beam 112 with one or more lasers arranged collinearly with the sample beam. The method 10 may further comprise the steps of obtaining data relating to resonantly produced electrons resulting from the ionization of the sample beam 114, and the above-described method of determining the presence of isotopes in the sample may additionally include using 116 data relating to the resonantly produced electrons.

Figure 5:
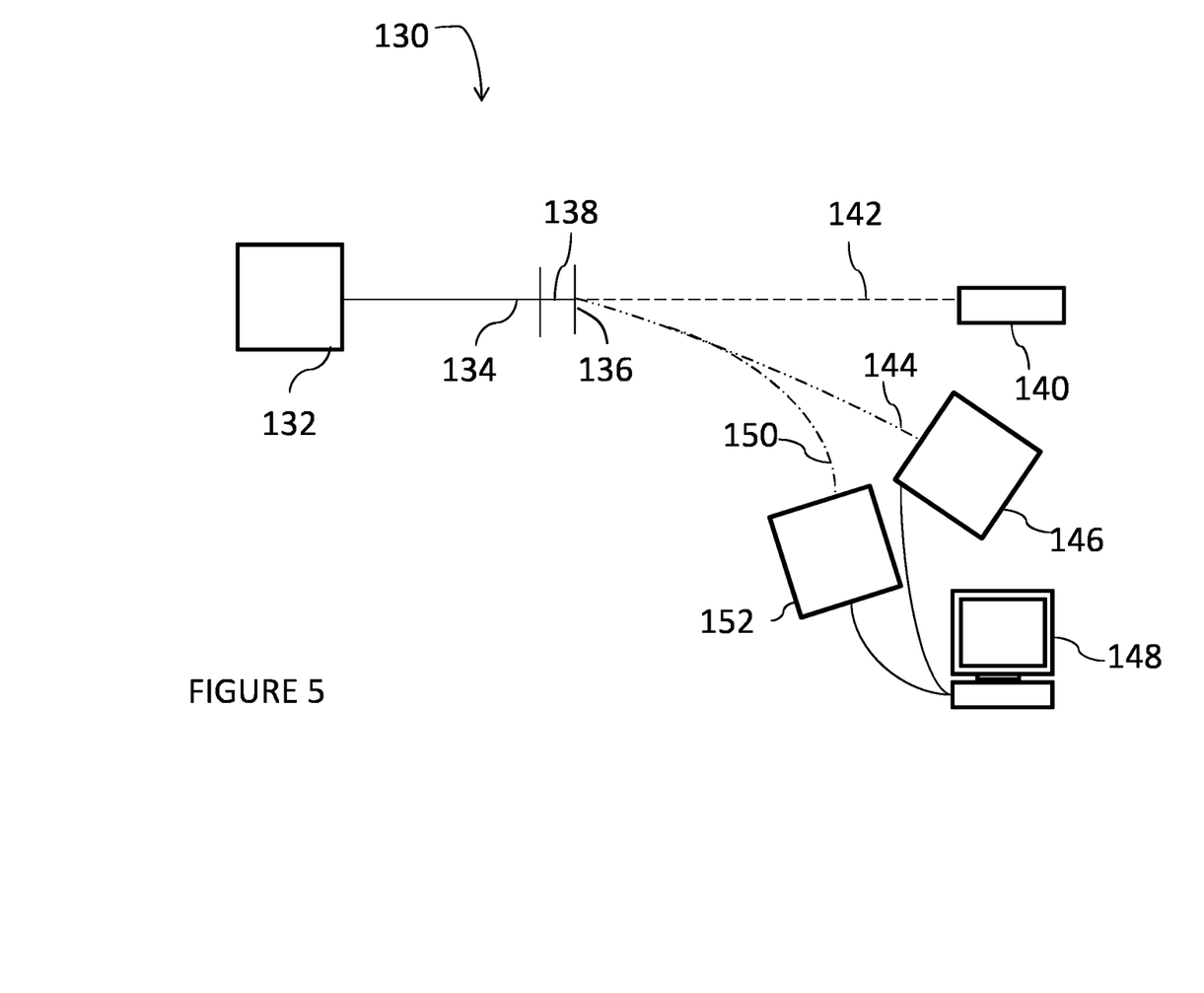
FIG. 5 shows a schematic drawing of an apparatus for performing a method according to an alternative embodiment of the present invention.

FIG. 5 shows an apparatus 130 according to an embodiment of the present invention, where the apparatus 130 may be used to perform methods according to certain embodiments of the invention. Features shown in FIG. 5 that correspond to features described above with reference to FIG. 2 are indicated by numerals preceded by '1' with respect to the numerals of FIG. 2. Variations of the features of FIG. 2 discussed above may equally be applied to the corresponding features of FIG. 5.

As shown in FIG. 5, a sample source 132 may provide a sample beam 134, and a laser 140 (which may be more than one laser in certain embodiments) may be arranged to produce a laser beam 142 (or more than one laser beam if multiple lasers are employed) that is collinearly arranged with the sample beam 134. Throughout the present specification, the term "collinearly arranged" means coaxial, i.e. parallel and axially aligned. That is, the laser beam 142 is parallel to and axially aligned with at least a portion of the sample beam 134. The laser beam 142 is used to resonantly ionize the sample beam 134 in accordance with step 112 of method 110.

In certain embodiments, the sample source 132 may be an atom, molecule or ion source. Examples of suitable ion sources include, but are not limited to, a plasma ion source, a sputter ion source, and a laser ion source. In certain embodiments, the sample source 132 may be held at a high voltage e.g. between 1 kV and 50 kV (however accelerating voltages outside of this range may be used to accelerate the sample beam 134).

The sample beam 134 enters an ion trap 136 where it is resonantly ionized by the laser beam 142. The resonant ionization of the sample beam 134 produces ions and additionally liberates electrons as part of the resonant ionization process. The ions produced may have multiple charge states (i.e. >1+) depending on the ionization scheme employed. The resonant ionization process may comprise the stepwise excitation of the sample beam 134 using one or more resonant lasers.

The "resonantly produced electrons" (resulting from the resonant ionization of the sample beam 134) will have an energy in the rest frame of the atom/molecule/ion (from which it was liberated) that is dependent on the difference between a final ionizing energy of the laser 140 and the ionization potential of the atom/molecule/ion. In preferable embodiments, this difference is minimized as far as possible. As a result of the resonant ionization of the sample beam 134, electrons and ions are produced. The electrons may be extracted as an electron beam 150 for detection by an electron detector 152 and the ions may be extracted as an ion beam 144 for detection by an ion detector 146. However, the electrons will include resonantly produced electrons and electrons that arise due to collisions. Similarly, the ions will include resonantly produced ions and ions resulting from collisions. The process of non-resonant collisional ionization ordinarily results (i.e. in prior art arrangements) in large isobaric contamination that will contribute to the recorded background signal (i.e. noise) in an ion detection process.

The method 110 mitigates this problem by obtaining, at step 114, data relating to resonantly produced electrons resulting from the ionisation of the sample beam, and subsequently determining, at step 116, the presence of isotopes in the sample using the data relating to resonant electrons. With reference to the apparatus 130 illustrated in FIG. 5, the step 114 of obtaining data relating to resonantly produced electrons may comprise detecting the electron beam 150 using the electron detector 152. A guide magnetic field that is arranged parallel to the electron beam 150 may be used to aid the transport of resonantly produced electrons. As the resonantly produced ions and electrons leave the interaction region (where resonant ionization takes place), the electrons may be extracted using a penetrating field and, further, may be injected into an electrostatic lens before detection by the electron detector 152. In certain embodiments, the electron detector 152 may comprise an electron spectrometer such as a hemispherical electron spectrometer.

Since the electron beam 150 may include resonantly produced and non-resonantly produced electrons (e.g. collisional electrons), some filtering or processing may be performed so that an electron signal predominately relating to resonantly produced electrons may be obtained. For example, electrons detected outside of a particular time window may be rejected (or not detected in the first place), as such electrons may be determined to arise from processes other than resonance. Suitable selection of this time window will improve the integrity of the electron signal with regard to resonantly produced electrons. The selection of the time window will be dependent on the time of operation of the laser (i.e. when the ionization process took place). Additionally or alternatively, electrons having energies outside of a predetermined range (or ranges) may be rejected (or not detected in the first place). Again, such electrons may be considered to not result from resonance and may therefore be ignored in the interest of reducing the noise caused by non-resonant electrons in the electron signal. Similarly, at least some of the collisional electrons may be deflected away from the electron detector 152 (e.g. using a cylindrical deflector analyser) so as to not contribute to the electron signal.

In a particular embodiment, the step 116 of determining the presence of ions in the sample using the data relating to resonant electrons comprises first producing 118 (see FIG. 4) an ion signal relating to ions resulting from the ionization of the sample beam 134. With reference to the apparatus 130 shown in FIG. 5, the step 118 of producing the ion signal may comprise detecting the ion beam 144 with the ion detector 146. Secondly, the ion signal may be processed using the data relating to the resonantly produced electrons.

Figure 4:
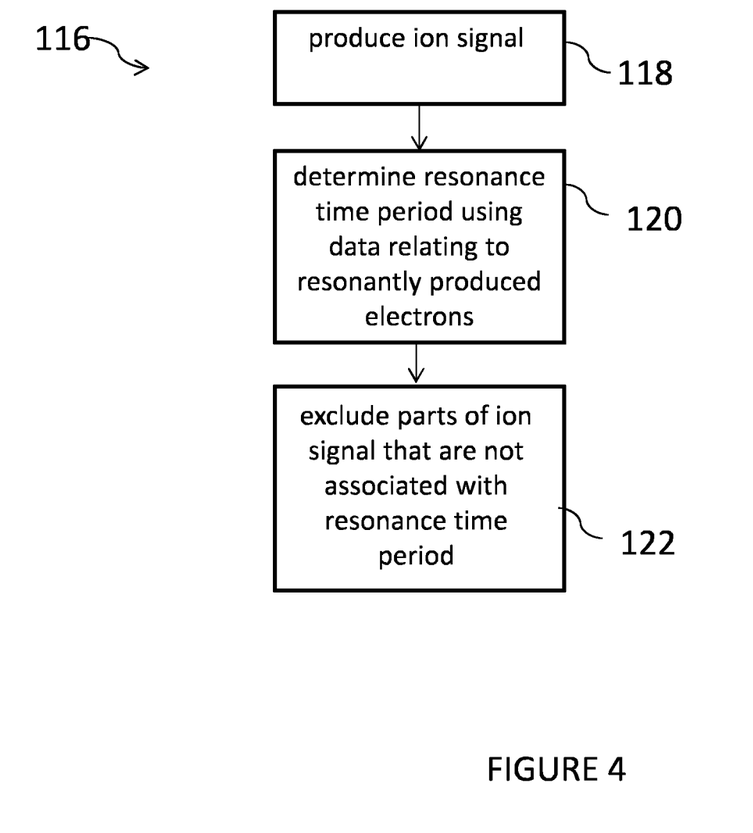
FIG. 4 shows specific steps of the method shown in FIG. 3.

In particular embodiments, as illustrated in FIG. 4, the method 110 may further comprise the step 120 of determining a resonance time period using the data relating to the resonantly produced electrons, and the step of processing the ion signal may comprise excluding 122 parts of the ion signal that are not associated with the determined resonance time period. That is, the data relating to the resonantly produced electrons may be used to indicate when resonance was taking place and the time period associated with this resonance may be determined. The determined resonance time period may then be used (e.g. using coincidence logic) to process the ion signal, e.g. by truncating the ion signal to only include data that corresponds to the resonance time period. In this manner, the ion signal may be processed to reduce data contained therein that relates to non-resonantly produced ions. In doing so, the signal to noise ratio in respect of detection of resonant ions is greatly reduced. Indeed, an electron-ion coincidence signal can be used to reduce random background signals in both the electron detector 152 and the ion detector 146.

The apparatus 130 may further comprise processing means, e.g. as part of a computer or controller 148 as illustrated in FIG. 5, that are communicably coupled so as to receive data from the electron detector 152 and receive data from the ion detector 146. The processing means may be configured to process the data received from the ion detector 146 using the data received from the electron detector 152 to determine the presence of ions in the sample (e.g. by performing coincidence logic).

In certain preferable embodiments, the above-described method 110 may further determine the presence of isotopes using the determination of the presence of ions in the sample. In particular, the determination of a particular resonantly produced ion may permit an isotope contained within the sample to be identified.

In alternative embodiments, the method may further comprise determining a detection period using the data relating to the resonantly produced electrons. Determining the presence of ions in the sample may then comprise only detecting ions resulting from the ionisation of the sample beam during the determined detection period. For example, the detection period may begin when a resonantly produced electron is detected by the electron detector 152. Alternatively, the detection period may begin after a delay period following the detection of a resonantly produced electron. In certain embodiments, the delay period may be a function of data relating to the time of flight of resonantly produced electrons and data relating to the time of flight of the sample beam. In particular, the delay period may be defined as $\overline{TOF}_{sample} - \overline{TOF}_{electron}$, where $\overline{TOF}_{sample}$ is the mean time of flight of sample beam and $\overline{TOF}_{electron}$ is the mean time of flight of the resonantly produced electrons.

In certain embodiments, the use of data relating to resonantly produced electrons in determining the presence of isotopes may be employed in addition to the use of data relating to the frequency of the one or more laser at the ionization time. Indeed, such embodiments would permit a time stamp associated with the creation of a particular ion to be obtained whilst reducing the effects of background noise through the consideration of resonant electrons.

In certain embodiments, the laser 40, 140 may be one or more pulsed and/or continuous wave lasers. Such suitable lasers include narrowband and broadband lasers. Suitable pulsed lasers may operate in the nanosecond range, and/or may include, without limitation, dye lasers TiSA lasers (which may be injection seeded), and Nd:YAG. Suitable Nd:YAG lasers may be pumped by flashlamps, fiber lasers or DPSS lasers. Suitable dye lasers and TiSa lasers may have a bandwidth greater than 1 GHz. Suitable injection seeded TiSA lasers may have a bandwidth between 6 and 100 MHz. Suitable continuous wave laser include, without limitation, ring dye lasers, TiSA lasers, diode lasers and fiber lasers and/or may have a bandwidth less than 5 MHz.

Throughout the description and claims of this specification, the words "comprise" and "contain" and variations of them mean "including but not limited to", and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

The invention claimed is:

1. A method of determining the presence of isotopes in a sample, comprising:
   providing a sample beam containing the sample;
   causing the sample beam to travel back and forth along a single longitudinal axis;
   ionizing the sample beam with one or more lasers, wherein ionizing the sample beam comprises operating the one or more lasers at a plurality of frequencies; and
   directing the sample beam out of the ion trap and subsequently determining time of flight data of a first part of the sample beam relative to a second part of the sample beam, wherein the first part of the sample beam has a different charge relative to the second part of the sample beam, and wherein determining the time of flight data of a first part of the sample beam relative to a second part of the sample beam includes detecting the first part of the sample beam and the second part of the sample beam with one or more detectors;
   determining an ionization time using the time of flight data;
   obtaining data relating to the frequency of the one or more lasers at the ionization time; and
   determining the presence of isotopes in the sample using the data relating to the frequency of the one or more lasers at the ionization time.

2. A method according to claim 1, wherein causing the sample beam to travel back and forth along the single longitudinal axis comprises directing the sample beam into an ion trap.

3. A method according to claim 2, wherein the ion trap is provided by a pair of electric potentials and/or wherein the ion trap comprises a Paul ion trap or a Penning ion trap.

4. A method according to claim 1, wherein providing the sample beam containing the sample comprises providing an ion beam, and optionally comprises providing the ion beam from a plasma ion source, a sputter ion source, or a laser ion source.

5. A method according to claim 1, wherein the sample beam contains 1+ ions prior to the step of ionizing the sample beam with the one or more lasers.

6. A method according to claim 1, wherein the step of ionizing the sample beam with the one or more lasers comprises producing 2+ ions.

7. A method according to claim 1, wherein the plurality of frequencies at which the one or more lasers is operated includes at least one electronic transition resonance of the sample.

8. A method according to claim 1, wherein operating the one or more lasers at the plurality of frequencies comprises operating the one or more lasers at the plurality of frequencies multiple times and/or scanning the one or more lasers through a range of frequencies.

9. A method according to claim 1, wherein prior to the step of causing the sample beam to travel back and forth along the single longitudinal axis the sample beam is mass separated to produce a mass separated beam, wherein the mass separated beam is optionally spatially bunched prior to the step of causing the sample beam to travel back and forth along the single longitudinal axis.

10. A method according to claim 1, wherein determining the presence of isotopes comprises identifying a single isotope using the data relating to the frequency of the one or more lasers at the ionisation ionization time.

11. A method according to claim 1, wherein ionizing the sample beam with the one or more lasers comprises resonantly ionizing the sample beam with one or more lasers arranged collinearly with the sample beam, and the method further comprises obtaining data relating to resonantly produced electrons resulting from the ionization of the sample beam, wherein the step of determining the presence of isotopes in the sample further comprises using the data relating to resonant electrons.

12. A method according to claim 11, wherein determining the presence of ions in the sample comprises:
   producing an ion signal relating to ions resulting from the resonant ionization of the sample beam; and
   processing the ion signal using the data relating to the resonantly produced electrons.

13. A method according to claim 12, further comprising determining a resonance time period using the data relating to the resonantly produced electrons, wherein processing the ion signal comprises excluding parts of the ion signal that are not associated with the determined resonance time period.

14. A method according to claim 11, further comprising determining a detection period using the data relating to the resonantly produced electrons, and wherein determining the presence of ions in the sample comprises detecting ions resulting from the resonant ionization of the sample beam during the determined detection period.

15. A method according to claim 14, wherein the detection period begins when a resonantly produced electron is detected.

16. A method according to claim 14, wherein the detection period begins after a delay period following the detection of a resonantly produced electron, wherein optionally the delay period is a function of data relating to the time of flight of resonantly produced electrons and data relating to the time of flight of the sample beam, and wherein further optionally the delay period is defined as $\overline{TOF}_{sample} - \overline{TOF}_{electron}$, where $\overline{TOF}_{sample}$ is the mean time of flight of sample beam and $\overline{TOF}_{electron}$ is the mean time of flight of the resonantly produced electrons.

17. A method according to claim 11, wherein obtaining data relating to the resonantly produced electrons comprises detecting resonantly produced electrons.

18. A method according to claim 17, comprising extracting resonantly produced electrons using a penetrating field extractor prior to the step of detecting resonantly produced electrons.

19. A method according to claim 17, wherein detecting resonantly produced electrons includes rejecting collisional electrons.

20. A method according to claim 19, wherein rejecting collisional electrons comprises deflecting collisional electrons away from resonantly produced electrons, optionally using a cylindrical deflector analyser.

21. A method according to claim 11, wherein the step of determining the presence of ions in the sample using the data relating to resonant electrons comprises identifying isotopes present in the sample.

22. A method according to claim 1, wherein the one or more lasers includes one or more pulsed lasers and/or continuous lasers.

* * * * *